US012655805B2

(12) United States Patent　　(10) Patent No.:　US 12,655,805 B2
　Sibbach et al.　　(45) Date of Patent:　Jun. 16, 2026

(54) HYDROGEN COMBUSTION CONTROL SYSTEM FOR A VEHICLE HAVING A TURBINE ENGINE

(71) Applicant: General Electric Company, Schenectady, NY (US)

(72) Inventors: Arthur William Sibbach, Boxford, MA (US); Michael Anthony Benjamin, Cincinnati, OH (US); Sibtosh Pal, Mason, OH (US); Erich Alois Krammer, West Chester, OH (US); Douglas Scott Jacobs, Boston, MA (US); Jacques Paul, Somerville, MA (US)

(73) Assignee: General Electric Company, Evendale, OH (US)

( * ) Notice: Subject to any disclaimer, the term of this patent is extended or adjusted under 35 U.S.C. 154(b) by 212 days.

(21) Appl. No.: 17/988,302

(22) Filed: Nov. 16, 2022

(65) Prior Publication Data

US 2024/0159193 A1　May 16, 2024

(51) Int. Cl.
　　*F02C 9/40*　　(2006.01)
　　*F02C 7/22*　　(2006.01)
　　*F02C 7/266*　　(2006.01)
(52) U.S. Cl.
　　CPC ................. *F02C 9/40* (2013.01); *F02C 7/22* (2013.01); *F02C 7/266* (2013.01)
(58) Field of Classification Search
　　None
　　See application file for complete search history.

(56) References Cited

U.S. PATENT DOCUMENTS 3,039,305　A　6/1962　Hall
3,982,878　A　9/1976　Yamane et al.
(Continued)

FOREIGN PATENT DOCUMENTS

CA　　　885178　A　11/1971
CN　　1627063　A　6/2005
(Continued)

OTHER PUBLICATIONS

Co-Pending U.S. Appl. No. 17/687,960, filed Mar. 7, 2022.
(Continued)

*Primary Examiner* — Phutthiwat Wongwian
*Assistant Examiner* — Jacek Lisowski
(74) *Attorney, Agent, or Firm* — McCarter & English, LLP

(57)　　　　ABSTRACT

A combustion system for a vehicle having an engine includes a hydrogen fuel system having a fuel source providing a hydrogen fuel, a combustor operable to combust the hydrogen fuel to generate combustion gases, and a fuel delivery assembly operable to deliver the hydrogen fuel from the fuel source to the combustor. A first control system has a first update rate and is operable to control one or more operational aspects of the turbine engine. A second control system is in communication with the first control system and the hydrogen fuel system and has a second update rate faster than the first update rate. The second control system is operable to monitor at least one parameter associated with the hydrogen fuel system and output at least one control signal to the hydrogen fuel system to control the delivery or the combustion of the hydrogen fuel.

19 Claims, 4 Drawing Sheets

(56) References Cited

U.S. PATENT DOCUMENTS

| | | | |
|---|---|---|---|
| 4,756,854 A | 7/1988 | Wegrzyn | |
| 4,784,959 A | 11/1988 | Wegrzyn | |
| 4,822,743 A | 4/1989 | Wegrzyn | |
| 4,844,743 A | 7/1989 | Koblenzer et al. | |
| 5,394,685 A | 3/1995 | Kesten et al. | |
| 6,267,585 B1 | 7/2001 | Suttrop | |
| 6,984,465 B2 | 1/2006 | Canepa et al. | |
| 7,192,459 B2 | 3/2007 | Puri et al. | |
| 7,752,885 B2 | 7/2010 | Huang | |
| 7,811,688 B2 | 10/2010 | Flynn et al. | |
| 7,915,047 B2 | 3/2011 | Thorn et al. | |
| 8,113,708 B2 | 2/2012 | Albertson | |
| 8,319,833 B2 | 11/2012 | Weinstein et al. | |
| 8,394,553 B2 | 3/2013 | Flynn et al. | |
| 8,430,360 B2 | 4/2013 | Schwarze et al. | |
| 8,470,933 B2 | 6/2013 | Thorn et al. | |
| 8,490,406 B2 | 7/2013 | Dinu et al. | |
| 8,778,545 B2 | 7/2014 | Lehar et al. | |
| 8,858,679 B2 | 10/2014 | Buhrman et al. | |
| 9,022,730 B2 | 5/2015 | Vysohlid et al. | |
| 9,239,008 B2 | 1/2016 | Ekanayake et al. | |
| 9,269,205 B1 | 2/2016 | Lamkin et al. | |
| 9,318,757 B2 | 4/2016 | Koenig et al. | |
| 9,464,573 B2 | 10/2016 | Remy et al. | |
| 9,581,086 B2 | 2/2017 | Tiwari et al. | |
| 9,683,910 B2 | 6/2017 | Ekanayake et al. | |
| 10,112,486 B2 | 10/2018 | Ban et al. | |
| 10,222,291 B2 | 3/2019 | Thompson et al. | |
| 10,286,336 B2 | 5/2019 | Durward | |
| 10,286,408 B2 | 5/2019 | Lam et al. | |
| 10,386,259 B2 | 8/2019 | Zhang et al. | |
| 10,473,031 B2 | 11/2019 | Ellsworth et al. | |
| 10,578,585 B1 | 3/2020 | Gerardi et al. | |
| 10,584,616 B2 | 3/2020 | Moxon | |
| 10,584,635 B2 | 3/2020 | Armstrong et al. | |
| 10,753,677 B2 | 8/2020 | Suraganda Narayana et al. | |
| 10,823,066 B2 | 11/2020 | Miller et al. | |
| 11,073,169 B2 | 7/2021 | Thatte | |
| 11,125,165 B2 | 9/2021 | Niergarth et al. | |
| 11,139,491 B2 | 10/2021 | Kwon et al. | |
| 2006/0257094 A1 | 11/2006 | McEvoy et al. | |
| 2009/0239105 A1* | 9/2009 | Yoshida | H01M 8/04432 |
| | | | 429/424 |
| 2013/0024179 A1* | 1/2013 | Mazzaro | F01D 17/20 |
| | | | 703/18 |
| 2013/0139897 A1 | 6/2013 | Kim et al. | |
| 2015/0101419 A1 | 4/2015 | Hill et al. | |
| 2015/0266589 A1 | 9/2015 | Blumer et al. | |
| 2015/0315978 A1 | 11/2015 | Davies et al. | |
| 2015/0337730 A1 | 11/2015 | Kupiszewski et al. | |
| 2016/0025339 A1 | 1/2016 | Kamath et al. | |
| 2016/0123226 A1 | 5/2016 | Razak et al. | |
| 2017/0022960 A1* | 1/2017 | Takeda | F02P 9/007 |
| 2017/0138236 A1* | 5/2017 | Sundaram | B01D 53/62 |
| 2018/0128175 A1* | 5/2018 | Huang | F02C 9/28 |
| 2019/0003386 A1 | 1/2019 | Stapp | |
| 2019/0128232 A1* | 5/2019 | Marrs | F02P 5/145 |
| 2019/0264618 A1* | 8/2019 | Ajami | F02C 7/262 |
| 2020/0340881 A1 | 10/2020 | Hattori | |
| 2020/0348662 A1 | 11/2020 | Cella et al. | |
| 2021/0095601 A1 | 4/2021 | Yeung et al. | |
| 2021/0095631 A1* | 4/2021 | Terada | F02P 3/05 |
| 2021/0148283 A1 | 5/2021 | Niergarth et al. | |
| 2021/0151783 A1 | 5/2021 | Miftakhov | |
| 2021/0285371 A1* | 9/2021 | Jaerling | F23R 3/26 |

| | | | |
|---|---|---|---|
| 2021/0340908 A1 | 11/2021 | Boucher et al. | |
| 2022/0145801 A1 | 5/2022 | McCurdy Gibson et al. | |
| 2022/0178306 A1 | 6/2022 | Durand et al. | |

FOREIGN PATENT DOCUMENTS

| | | | |
|---|---|---|---|
| CN | 200990131 Y | 12/2007 | |
| CN | 104948303 A | 9/2015 | |
| EP | 3805107 A1 | 4/2021 | |
| JP | 2014025741 A | 2/2014 | |
| WO | WO2011119338 A1 | 9/2011 | |
| WO | WO2012/173651 A1 | 12/2012 | |

OTHER PUBLICATIONS

Co-Pending U.S. Appl. No. 17/687,976, filed Mar. 7, 2022.
Co-Pending U.S. Appl. No. 17/209,719, filed Mar. 23, 2021.
Co-Pending U.S. Appl. No. 17/209,721, filed Mar. 23, 2021.
Co-Pending U.S. Appl. No. 17/209,724, filed Mar. 23, 2021.
Drafts, Acoustic Wave Technology Sensors, Fierce Electronics, Oct. 2000, 17 Pages.
Ke et al., Detecting Phase Transitions in Supercritical Mixtures: An Enabling Tool for Greener Chemical Reactions, Proceedings of the Royal Society A, vol. 466, 2010, pp. 2799-2812.
Ke et al., The Phase Equilibrium and Density Studies of the Ternary Mixtures of $CO_2 + Ar + N_2$ and $CO_2 + Ar + H_2$, Systems Relevance to CCS Technology, International Journal of Greenhouse Gas Control, vol. 56, Jan. 2017, pp. 55-56.
Fandino et al., Phase Behavior of ($CO_2 + H_2$) and ($CO_2 + N_2$) at Temperatures Between (218.15 and 303.15) K at Pressures up to 15 MPa, International Journal of Greenhouse Gas Control, vol. 36, May 2015, 39 Pages.
Fehrm, Bjorn's Corner: The Challenges of Hydrogen. Part 29. Gas Turbine Heat Management, Leeham News and Analysis, Mar. 19, 2021, 3 Pages. https://leehamnews.com/2021/03/19/bjorns-comper-tt en-part-29-gas-turbine-beat-management/.
Gonzalez-Portillo, A New Concept in Thermal Engineering Optimization: The Pericritical Cycle with Multi-Heating and its Application to Concentrating Solar Power, Sep. 2019, 233 Pages. (Abstract Only) Retrieved Mar. 7, 2022 from Weblink: https://oa.upm.es/56492/.
Goos et al., Phase Diagrams of $CO_2$ and $CO_2-N_2$ Gas Mixtures and Their Application in Compression Processes, Energy Procedia, vol. 4, 2011, pp. 3778-3785.
Javed et al., Thermodynamic Speed of Sound Data for Liquid and Supercritical Alcohols, Journal of Chemical & Engineering Data, vol. 64, No. 3, 2019, pp. 1035-1044.
Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.
Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.
Park et al., Measurements of Density and Sound Speed in Mixtures Relevant to Supercritical $CO_2$ Cycles, Journal of Energy Resources Technology, vol. 142, Oct. 2020, 7 Pages.
Wetenhall et al., The Effect of $CO_2$ Purity on the Development of Pipeline Networks for Carbon Capture and Storage Schemes, International Journal of Greenhouse Gas Control, vol. 30, 2014, pp. 197-211.
Extended European Search Report for Application No. 25200563.2, dated Mar. 13, 2026, 5 pages.

* cited by examiner

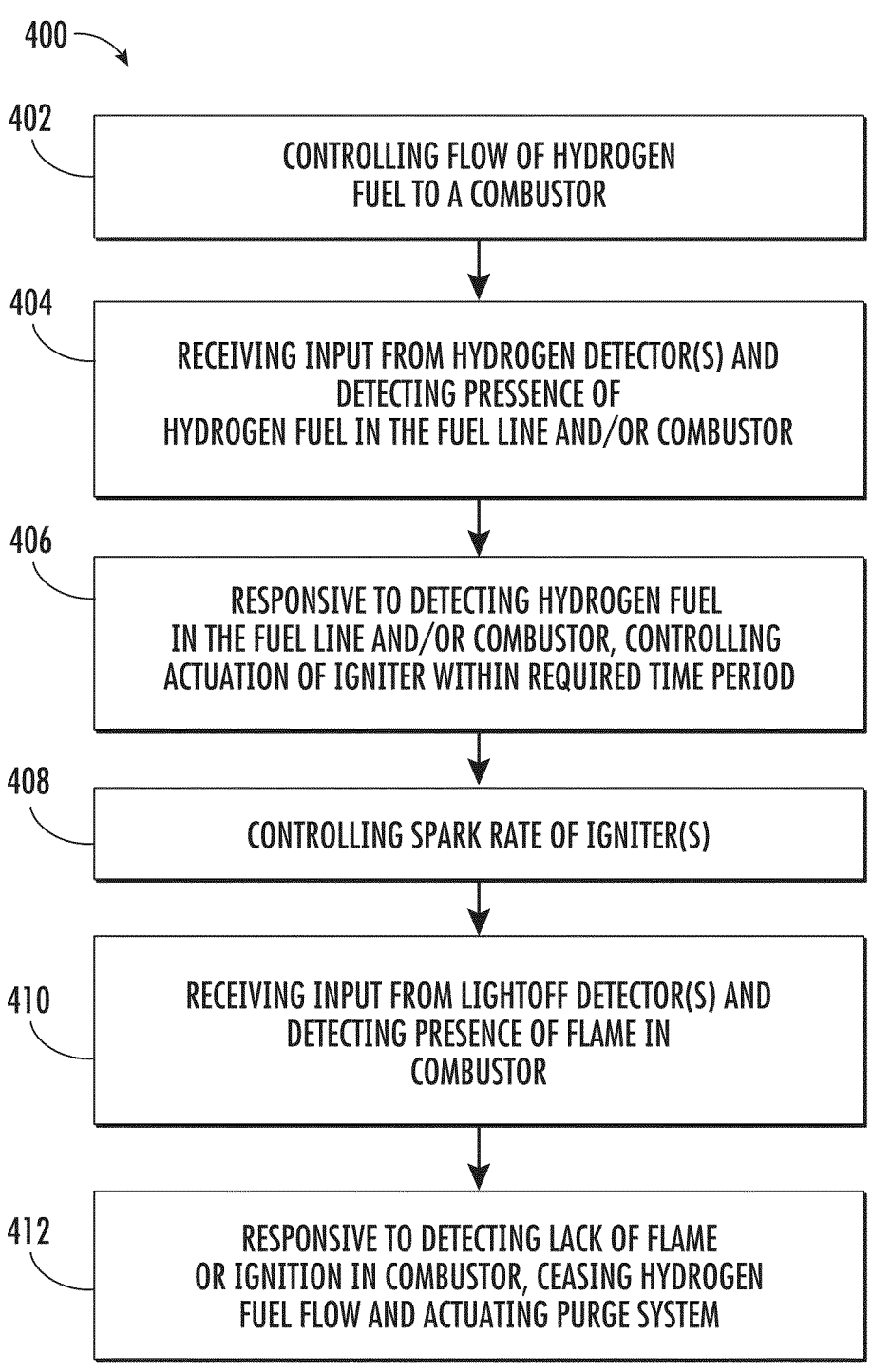

400

402 — CONTROLLING FLOW OF HYDROGEN
FUEL TO A COMBUSTOR

404 — RECEIVING INPUT FROM HYDROGEN DETECTOR(S) AND
DETECTING PRESSENCE OF
HYDROGEN FUEL IN THE FUEL LINE AND/OR COMBUSTOR

406 — RESPONSIVE TO DETECTING HYDROGEN FUEL
IN THE FUEL LINE AND/OR COMBUSTOR, CONTROLLING
ACTUATION OF IGNITER WITHIN REQUIRED TIME PERIOD

408 — CONTROLLING SPARK RATE OF IGNITER(S)

410 — RECEIVING INPUT FROM LIGHTOFF DETECTOR(S) AND
DETECTING PRESENCE OF FLAME IN
COMBUSTOR

412 — RESPONSIVE TO DETECTING LACK OF FLAME
OR IGNITION IN COMBUSTOR, CEASING HYDROGEN
FUEL FLOW AND ACTUATING PURGE SYSTEM

FIG. 4

HYDROGEN COMBUSTION CONTROL SYSTEM FOR A VEHICLE HAVING A TURBINE ENGINE

FIELD

The present subject matter relates generally to a hydrogen combustion control system for vehicle, such as a hydrogen combustion control system for an aeronautical vehicle.

BACKGROUND

A conventional commercial aircraft generally includes a fuselage, a pair of wings, and a propulsion system that provides thrust. The propulsion system typically includes one or more aircraft engines, such as turbofan jet engines. The turbofan jet engine(s) may be typically mounted to a respective one of the wings of the aircraft, such as in a suspended position beneath the wing, mounted to the wing using a pylon.

The aircraft includes a fuel delivery assembly that generally includes a fuel tank and one or more fuel lines that extend between the fuel tank and the aircraft engines. Traditional aircraft engines are powered by aviation turbine fuel, which is typically a combustible hydrocarbon liquid fuel, such as a Kerosene-type fuel, having a desired carbon number. The aviation turbine fuel is a relatively power-dense fuel that is relatively easy to transport and stays in a liquid phase through most ambient operating conditions for aircraft.

It has been argued that improvements in emissions from conventional aircraft having aircraft engines powered by aviation turbine fuel may be achieved by utilizing a hydrogen fuel. Hydrogen fuel is not a relatively power-dense fuel in its gaseous form and defines a relatively low boiling point and a relatively low freezing point.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 is a block diagram depicting an embodiment of a method of controlling a hydrogen fuel combustion system in accordance with various aspects of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
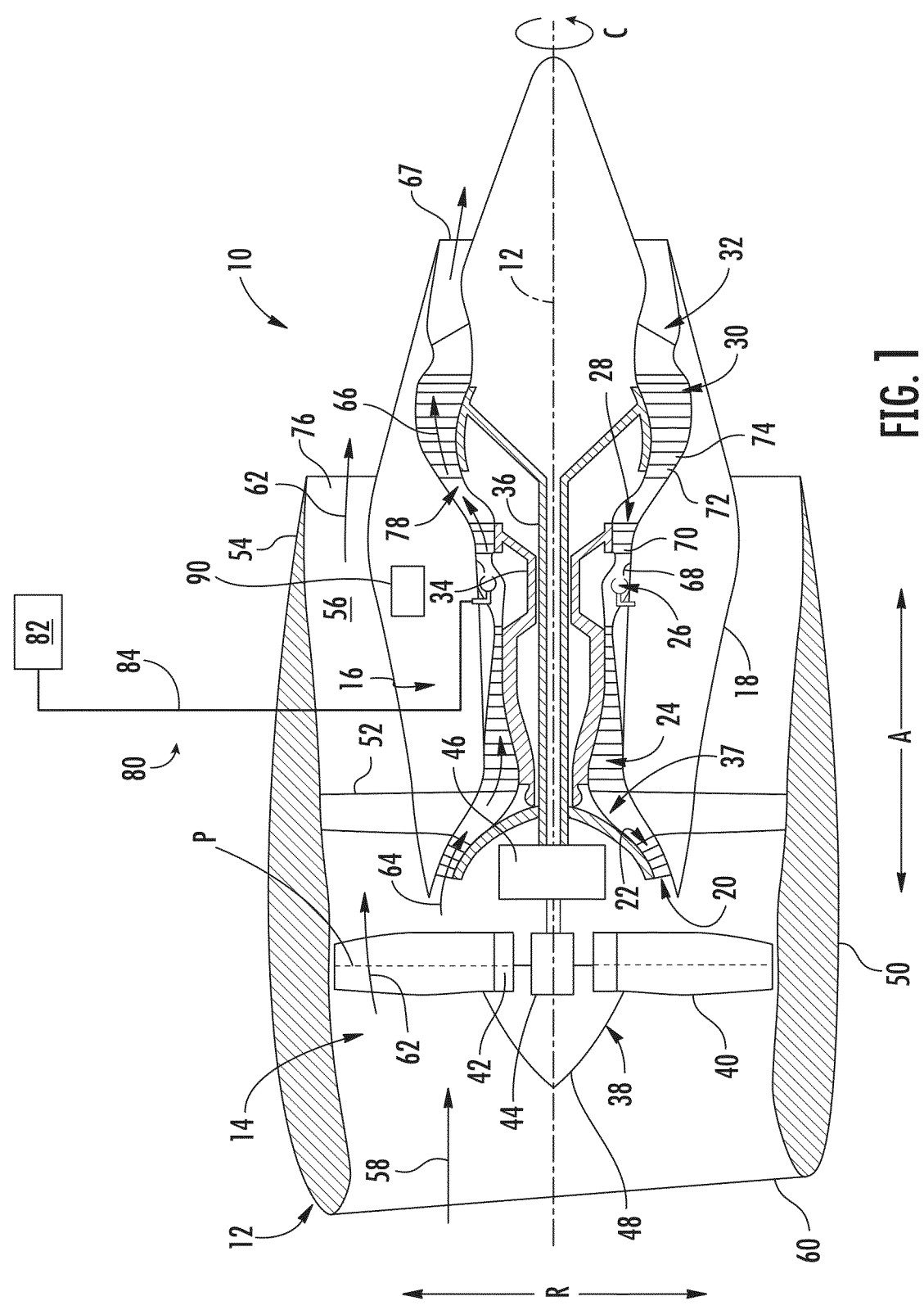
FIG. 1 is a schematic, cross-sectional view of an exemplary gas turbine engine according to various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper" and "lower", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "at least one of" in the context of, e.g., "at least one of A, B, and C" refers to only A, only B, only C, or any combination of A, B, and C.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The present disclosure is generally related to a hydrogen combustion control system for a vehicle, such as an aircraft turbine engine. Embodiments of the present disclosure include one control system (e.g., a main or primary control system) for monitoring and managing certain engine operating parameters and a second control system operating at a faster response or update rate than the first control system for monitoring and managing the hydrogen-related operating parameters of the engine. For example, in some embodiments, the second, faster control system is used to monitor and control hydrogen fuel flow delivery, hydrogen fuel flow rates, the presence of hydrogen fuel in various locations of the engine, the combustion process associated with the hydrogen fuel, and a purge system for purging the hydrogen fuel from various parts of the engine. Instead of adding software and hardware complexity to the first or primary control system, sensor monitoring and operational control of the hydrogen-related aspects of the engine operation are performed by the second, dedicated control system. Additionally, by having a dedicated control system controlling the hydrogen-related aspects of the engine and operating that control system at a faster feedback/response loop rate, unique aspects associated with the combustion of hydrogen are monitored and controlled in shorter time periods and without overburdening the primary control system.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference), a radial direction R, and a circumferential direction C extending about the longitudinal axis 12. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section, also referred to herein as an exhaust section, 32. The compressor section, the combustion section 26, the turbine section, and the exhaust section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, the disk 42, and the actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the turbomachine 16. The outer nacelle 50 is supported relative to the turbomachine 16 by a plurality of circumferentially-spaced outlet guide vanes 52. Moreover, the outer nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In the illustrated embodiment, as is depicted schematically, the exemplary turbofan engine 10 further includes a hydrogen fuel system 80 providing a flow of fuel to the combustion section 26 of the turbofan engine 10. In certain exemplary aspects, the turbofan engine 10 is a hydrogen engine, and the fuel system 80 is configured to provide hydrogen fuel to the turbofan engine 10. The fuel system 80 generally includes a fuel source 82 (e.g., a fuel tank) positioned within a fuselage or one or more wings of an aircraft including the turbofan engine 10 for holding the hydrogen fuel in a liquid phase (e.g., at least partially within a liquid phase or substantially completely within a liquid phase). The fuel system 80 also includes a fuel delivery assembly 84 extending from the fuel source 82 to the turbofan engine 10 for providing the hydrogen fuel from the fuel source 82 to the turbofan engine 10. The fuel delivery assembly 84 may include a vaporizer (not shown) for heating the hydrogen fuel in the liquid phase to a gaseous phase, to a supercritical phase, or both, and a high pressure pump (not shown) at a location downstream of the vaporizer for inducing a flow of the hydrogen fuel through the fuel delivery assembly 84 to the engine 10. The exemplary turbofan engine 10 also includes a hydrogen combustion control system 90 for controlling the combustion of the hydrogen fuel by the combustion section of the turbofan engine 10 and various operating parameters of the fuel system 80.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as a turbojet engine, turboshaft engine, turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

Figure 2:
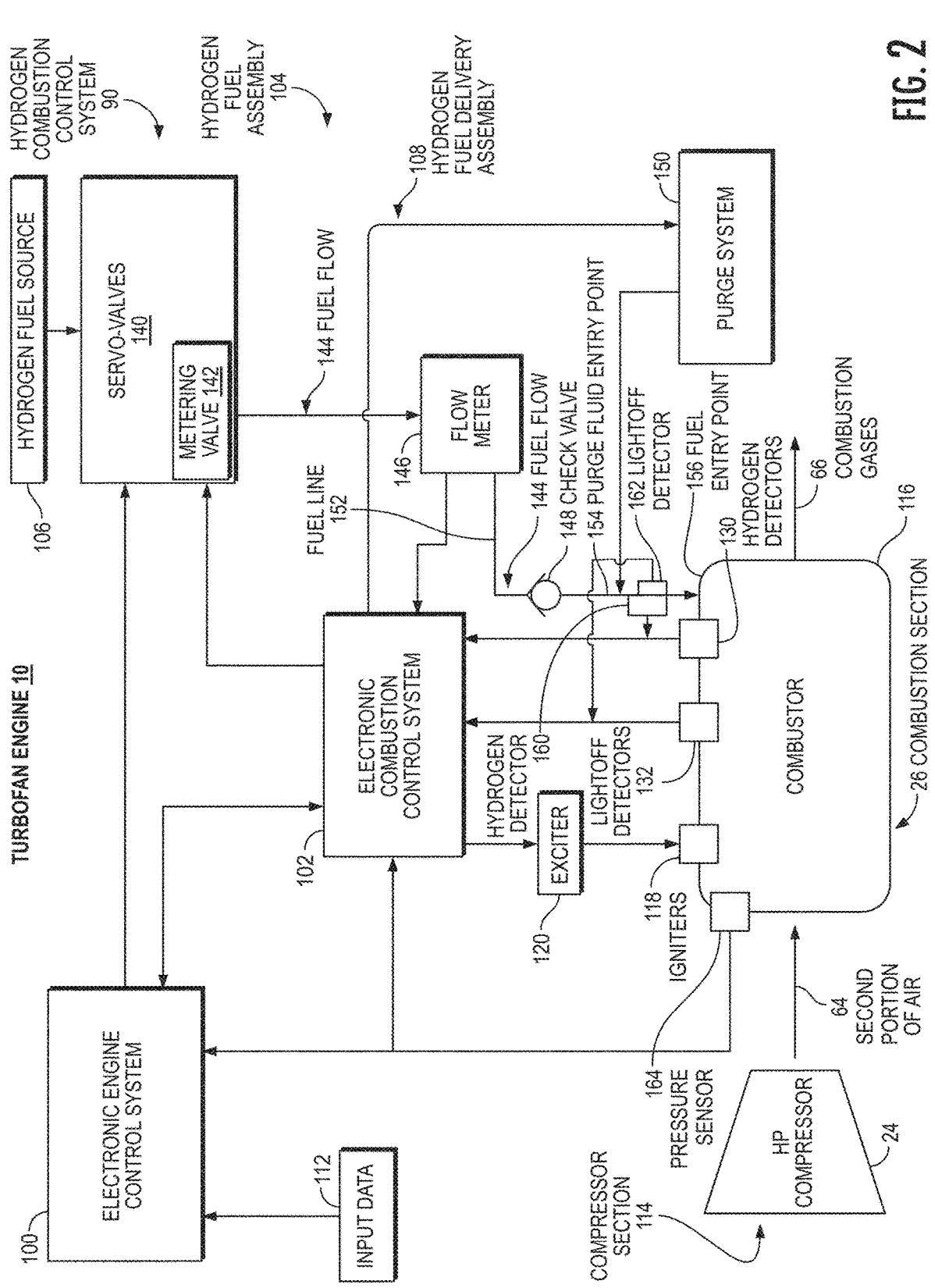
FIG. 2 is a simplified schematic view of a hydrogen combustion control system for a turbine engine in accordance with an exemplary embodiment of the present disclosure.

Referring now to FIG. 2, a simplified, block diagram of the hydrogen combustion control system 90 of FIG. 1 for a vehicle having an engine is provided in accordance with an exemplary aspect of the present disclosure. In the illustrated embodiment, the hydrogen combustion control system 90 is configured for use in the exemplary turbofan engine 10 described above with reference to FIG. 1.

In the exemplary embodiment depicted in FIG. 2, the hydrogen combustion system 90 includes an electronic engine control system 100, an electronic combustion control system 102, and a hydrogen fuel assembly 104. The hydrogen fuel assembly 104 includes a hydrogen fuel source 106, a hydrogen fuel delivery assembly 108, and a combustor 116 (e.g., part of the combustion section 26 of FIG. 1). The hydrogen fuel source 106 (e.g., a fuel tank) may be positioned within a fuselage or one or more wings of an aircraft including the turbofan engine 10 for holding the hydrogen fuel in a liquid phase (e.g., at least partially within a liquid phase or substantially completely within a liquid phase). The hydrogen fuel delivery assembly 108 extends from the fuel source 106 to the combustor 116 for providing the hydrogen fuel from the fuel source 106 to the combustor 116.

Electronic engine control system 100 may be a dual channel full authority direct engine control (FADEC) system (although only a single channel is depicted) dedicated to the propulsion system of a vehicle (e.g., the turbofan engine 10) or may be incorporated into one or more of a main controller for the vehicle (such as an aircraft containing the turbofan engine 10). In the illustrated embodiment, the electronic combustion control system 102 is a dedicated control system (such as a FADEC) for monitoring and controlling the hydrogen fuel assembly 104. For example, in the illustrated embodiment, the electronic combustion control system 102 is a dedicated control system for monitoring various parameters and issuing various control commands to the various components of the hydrogen fuel assembly 104 (e.g., the hydrogen fuel delivery assembly 108 and the combustor 116) associated with the delivery and combustion of the hydrogen fuel. Control systems 100 and 102 may be configured in substantially the same manner as the computing system 200 described below with reference to FIG. 3.

In operation, the electronic engine control system 100 monitors and controls various parameters of turbofan engine 10 performance and operating characteristics. For example, in some embodiments, the electronic engine control system 100 receives input data 112 in the form of temperatures, pressures, speeds, power, and other operating parameters of the turbofan engine 10 (e.g., data related to the fan section 14, the compressor section, the turbine section, etc.) and controls various operating aspects of the turbofan engine 10 based on those inputs (e.g., vis control signals output to one or more systems or devices). The electronic combustion control system 102 monitors and controls various operating parameters and characteristics associated with the delivery and combustion of the hydrogen fuel (e.g., by receiving input data from one or more sensors/devices and outputting control signals to one or more devices/systems associated with the hydrogen delivery and combustion systems). In some embodiments, the electronic engine control system 100 operates at a single update rate (e.g., 12-25 milliseconds). In the exemplary embodiment of the present disclosure, the electronic combustion control system 102 operates at a different (e.g., faster) update rate than the electronic engine control system 100 to accommodate various operating parameters associated with the combustion of hydrogen. For example, in some embodiments, the electronic combustion control system 102 operates at an update rate of 10 milliseconds or less. The update rate of the electronic combustion control system 102 is operated at a faster update rate than the electronic engine control system 100 to enable a rapid response to perturbations in the combustion section 26 and maintain combustion stability. In some embodiments, the electronic engine control system 100 and the electronic combustion control system 102 may be asynchronous to each other.

In FIG. 2, the HP compressor 24 of a compressor section 114 of the turbofan engine 10 is depicted in fluid communication with the combustor 116 of the combustion section 26. As described above, during operation, compressed air (e.g., the second portion of air 64) from the compressor section 114 of the turbofan engine 10 is mixed with fuel and ignited to create combustion gases 66 within the combustor 116. The combustor 116 includes igniters 118 (only one is shown in FIG. 2) spaced from one another along the circumferential direction C (FIG. 1). The igniters 118 facilitate ignition of the compressed air/fuel mixture within the combustor 116. The hydrogen fuel assembly 104 also includes an exciter 120. Actuation of the igniters 118 is controlled by the exciter 120. The exciter 120 takes input current from the electrical system of the vehicle and delivers a voltage output to the igniter 118. The igniter 118 then creates a spark in the combustor 116 for igniting the air/fuel mixture.

In the illustrated embodiment, the combustor 116 includes hydrogen detectors 130 (only one is shown in FIG. 2) and lightoff detectors 132 (only one is shown in FIG. 2). Similar to the igniters 118, the hydrogen detectors 130 and the lightoff detectors 132 may be spaced from one another along the circumferential direction C (FIG. 1) or otherwise located at various locations of the combustor 116. The hydrogen detectors 130 are configured to detect the presence of hydrogen in the combustor 116. The lightoff detectors 132 are configured to detect a presence of a flame in the combustor 116 indicating combustion of the air/fuel mixture.

Referring still to FIG. 2, the hydrogen fuel delivery assembly 108 of the hydrogen fuel assembly 104 delivers the hydrogen fuel to the combustor 116 from the hydrogen fuel source 106. In the illustrated embodiment, the hydrogen fuel delivery assembly 108 comprises actuator servo-valves 140 for controlling the flow of fuel from the fuel source 106 and includes a metering valve 142 for controlling a fuel flow 144 delivered to the combustor 116. A flow meter 146 is disposed in communication with the fuel flow 144 for determining and/or controlling a flow rate of the hydrogen fuel to the combustor 116. In FIG. 2, a check valve 148 is located in communication with the fuel flow 144 downstream of the flow meter 146 and upstream from the combustor 116 to ensure a one-way flow of the hydrogen fuel to the combustor 116.

In the illustrated embodiment, the hydrogen combustion system 90 also includes a purge system 150 for evacuating a remaining volume of hydrogen fuel from a localized portion the fuel delivery assembly 108 and the combustor 116. In the illustrated embodiment, the purge system 150 is in communication with a fuel line 152 delivering the hydrogen fuel to the combustor 116. Due to the cryogenic properties of a liquid hydrogen fuel system, the purge system 150 is configured to provide a purge fluid (e.g., an inert fluid) through the fuel line 152 to evacuate a remaining volume of hydrogen fuel from the fuel delivery assembly 108 and the combustor 116, thereby preventing any water vapor from freezing in the fuel delivery assembly 108 or the combustor 116. In the illustrated embodiment, the purge system 150 is in communication with the fuel line 152 downstream of the check valve 148 and upstream from the combustor 116 such that the purge system 150 purges the hydrogen fuel from a localized portion of the fuel delivery assembly 108 (e.g., a localized portion of the fuel line 152 upstream of the combustor 116 and proximate the combustor 116), thereby enabling the hydrogen fuel to remain in locations of the fuel delivery assembly 108 located upstream of the check valve 148. Thus, in this embodiment, the purge system 150 has a purge fluid entry point 154 into the fuel delivery assembly 108 (e.g., into fuel line 152) proximate the fuel entry point 156 into the combustor 116.

In the embodiment illustrated in FIG. 2, a hydrogen detector 160 is located in communication with the fuel line 152 proximate the combustor 116 downstream from the check valve 148 and upstream from the combustor 116. Similar to as described above in connection with the hydrogen detector 130, the hydrogen detector 160 detects the presence of the hydrogen fuel within the fuel line 152. Thus, in the illustrated embodiment, while the hydrogen detectors 130 are configured to detect the presence of hydrogen fuel in the combustor 116, the hydrogen detector 160 is configured to detect the presence of hydrogen fuel in the fuel line 152 proximate a fuel entry point into the combustor 116. In FIG. 2, a lightoff detector 162 is also disposed proximate a fuel entry point into the combustor 116 to detect presence of a flame in the combustor 116 indicating combustion of the air/fuel mixture. In some embodiments, the lightoff detectors 132 and 162 may be optical or infrared sensors. In the embodiment illustrated in FIG. 2, a pressure sensor 164 is disposed in communication with the with second portion of air 64 exiting the HP compressor 24 and entering the combustor 116 to detect the pressure of the air 64 entering the combustor 116.

As indicated in FIG. 2, the electronic combustion control system 102 receives inputs from the hydrogen detectors 130 and 160, the lightoff detectors 132 and 162, the flow meter 146, and the pressure sensor 164. Based on the inputs or data received from the hydrogen detectors 130 and 160, the lightoff detectors 132 and 162, the flow meter 146, and the pressure sensor 164, electronic combustion control system 102 issues control commands to manage and control the delivery of the hydrogen fuel to the combustor 116, the combustion process performed by the combustor 116, and actuation of the purge system 150.

For example, in a hydrogen combustion system for a turbine engine, several issues arise that are significantly different from combustion of hydrocarbon fuels. The flame speed of hydrogen is much faster (e.g., about six times faster) than the flame speed of hydrocarbon fuels. As such, the hydrogen combustion process reacts to changes in fuel flow or air pressure more quickly. Embodiments of the present disclosure provide the electronic combustion control system 102 with a faster update rate or loop response rate than the electronic engine control system 100 to react to combustion changes and update fuel flow faster than would otherwise be performed by the electronic engine control system 100. Further, by providing a dedicated control system (e.g., the electronic combustion control system 102) with a faster update rate than the primary control system (e.g., the electronic engine control system 100) for monitoring and controlling the hydrogen fuel assembly 104, processor throughput for the electronic combustion control system 102 is handled more efficiently than would otherwise occur if the electronic engine control system 100 was used to control the hydrogen fuel delivery and combustion process.

Further, when hydrogen fuel is introduced to the combustor 116, ignition must be rapidly achieved (e.g., within thirty milliseconds) to ensure that hydrogen gas does not reach the turbine section of the turbofan engine 10 prior to ignition. Accordingly, the electronic combustion control system 102 is also used to control actuation of the purge system 150 to clear the hydrogen fuel during the shutdown of the turbofan engine 10, and prior to startup of the turbofan engine 10, to ensure that no water vapor freezes in the fuel system. Thus, in some instances, the hydrogen fuel delivery assembly 108 may have residual purge gas in the fuel lines (e.g., fuel line 152 and/or elsewhere) at startup. Accordingly, the electronic combustion control system 102 controls the opening of the metering valve 142 to deliver hydrogen fuel to the combustor 116. The electronic combustion control system 102 receives sensor inputs from hydrogen detectors 160 and/or 130 to detect the presence of the hydrogen fuel in the fuel line 152 and the combustor 116, respectively. Thus, by controlling actuation of the metering valve 142 and detecting the presence of the hydrogen fuel in the fuel line 152 and/or in the combustor 116, the electronic combustion control system 102 can measure and control a time period by which ignition must be detected (e.g., via inputs from lightoff detectors 132/162), or the system shut down/purged, and the lightoff process re-started. Thus, by controlling actuation of the metering valve 142 and detecting the presence of the hydrogen fuel in the fuel line 152 and/or in the combustor 116, the electronic combustion control system 102 controls actuation of the exciter 120, and correspondingly, the igniters 118, to initiate combustion in the combustor 116 within the desired time period.

Additionally, lightoff detection in hydrocarbon engines is typically based on a rise in temperature at the downstream side of the HP turbine 28 (FIG. 1). Embodiments of the present disclosure provide a much faster lightoff technique to accommodate hydrogen fuel use. In embodiments of the present disclosure, lightoff detectors 132 and/or 162 are embedded into the combustor 116 to detect the presence of a flame in the combustor 116, and data from the lightoff detectors 132 and/or 162 are input to the electronic combustion control system 102. For example, in some embodiments, lightoff detectors 132 and/or 162 may be optical lightoff detectors. Burning hydrogen creates a characteristic wavelength (e.g., approximately 310 nM in the ultraviolet (UV) spectrum). An optical lightoff detector 132/162 tuned to this spectrum is used to detect the presence of a flame in the combustor 116. Inputs from the lightoff detectors 132 and/or 162 are also used by the electronic combustion control system 102 to identify if a flameout occurs. If so, the electronic combustion control system 102 reacts by either turning ignition on or shutting off fuel flow and purging the combustor 116 (and the turbine section) of hydrogen before attempting a re-light. Inputs from hydrogen detectors 130/160 and lightoff detectors 132/162 may also be evaluated by the electronic combustion control system 102 to determine whether the purge system 150 requires actuation (e.g., the detection of the presence of the hydrogen fuel in the combustor 116 with a lack of a flame indicated by the lightoff detectors 132/162 within a set time period).

Embodiments of the present disclosure also provide a high-speed ignition system (e.g., the exciter 120 and igniters 118) to accommodate the use of hydrogen fuel. For example, an ignition exciter for a hydrocarbon fuel turbine engine produces approximately twelve sparks per second and may take one hundred milliseconds or longer from the time a spark command is issued until the first spark occurs. The electronic combustion control system 102 is configured to initiate a first spark by the igniters 118 within ten milliseconds of issuing a spark command to the exciter 120 and control the igniters 118 to provide a spark rate greater than twenty sparks per second. In some embodiments, the electronic combustion control system 102 is configured to control the igniters 118 to provide a spark rate of at least one hundred sparks per second. The increased spark rate is balanced by the lower power required to ignite hydrogen versus a hydrocarbon fuel. Thus, each spark will emit a small fraction of the energy of a conventional hydrocarbon fuel ignition system.

In the embodiment illustrated in FIG. 2, the electronic combustion control system 102 also receives sensor data from the pressure sensor 164. For example, the pressure sensor 164 may be used to detect lightoff or other combustion process perturbations. When lightoff occurs, there will be a momentary pressure burst in the combustor 116. This pressure burst or wave can indicate initiation of combustion, and similarly a pressure wave can be detected should a flameout or other combustion issues occur. The electronic combustion control system 102 uses the data received from the pressure sensor 164 to react to these instances and rapidly adjust the hydrogen fuel flow (e.g., via the metering valve 142 and/or flow meter 146) to compensate.

Figure 3:
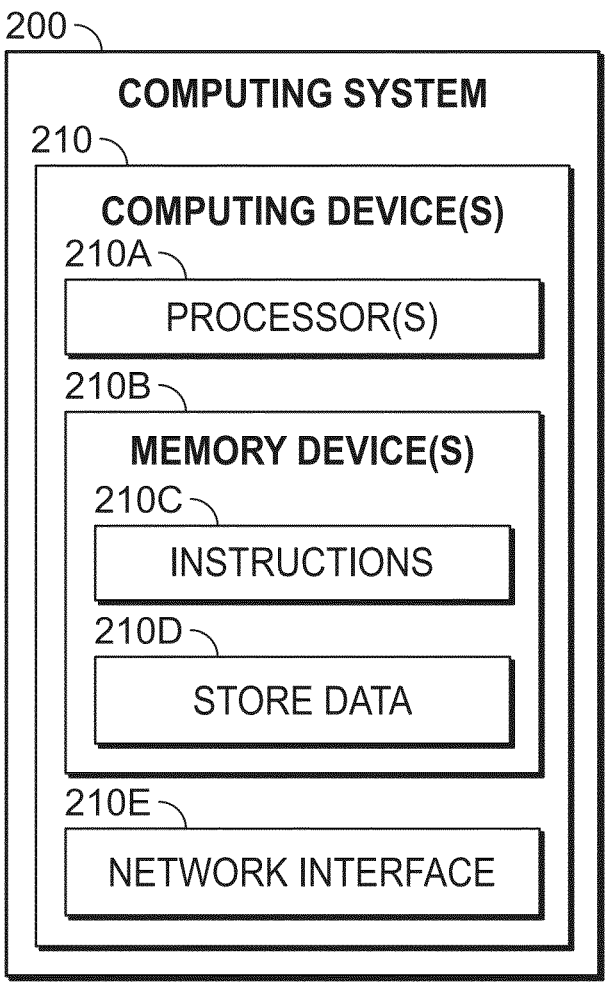
FIG. 3 is a block diagram of a computing system in accordance with various aspects of the present disclosure.

Referring now to FIG. 3, an example computing system 200 according to example embodiments of the present disclosure is depicted. The computing system 200 can be used, for example, as the electronic engine control system 100 and/or the electronic combustion control system 102. The computing system 200 can include one or more computing device(s) 210. The computing device(s) 210 can include one or more processor(s) 210A and one or more memory device(s) 210B. The one or more processor(s) 210A can include any suitable processing device, such as a microprocessor, microcontroller, integrated circuit, logic device, and/or other suitable processing device. The one or more memory device(s) 210B can include one or more computer-readable media, including, but not limited to, non-transitory computer-readable media, RAM, ROM, hard drives, flash drives, and/or other memory devices.

The one or more memory device(s) 210B can store information accessible by the one or more processor(s) 210A, including computer-readable instructions 210C that can be executed by the one or more processor(s) 210A. The instructions 210C can be any set of instructions that when executed by the one or more processor(s) 210A, cause the one or more processor(s) 210A to perform operations. In some embodiments, the instructions 210C can be executed by the one or more processor(s) 210A to cause the one or more processor(s) 210A to perform operations, such as any of the operations and functions for which the computing system 200 and/or the computing device(s) 210 are configured, the operations for operating one or more of the electronic engine control system 100 and/or the electronic combustion control system 102, as described herein, and/or any other operations or functions of the one or more computing device(s) 210. Aspects of the present disclosure are described herein with reference to illustrations and/or block diagrams of methods and/or apparatus according to embodiments the disclosure. It should be understood that each block of the illustrations and/or block diagrams, and combinations of blocks in the illustrations and/or block diagrams, may represent a module, segment, or portion of code, can be implemented by computer readable program instructions. Accordingly, the operations performed by the electronic engine control system 100 and/or the electronic combustion control system 102 may be computer-implemented processes and may comprise software, logic and/or executable code for performing various functions as described herein (e.g., residing as software and/or an algorithm running on a processor unit, hardware logic residing on a processor or other type of logic chip, centralized in a single integrated circuit or distributed among different chips in a data processing system). The instructions 210C can be software written in any suitable programming language or can be implemented in hardware. Additionally, and/or alternatively, the instructions 210C can be executed in logically and/or virtually separate threads on processor(s) 210A. The memory device(s) 210B can further store data 210D that can be accessed by the processor(s) 210A. For example, the data 210D can include data indicative of hydrogen detection, hydrogen fuel flow, flame or lightoff detection, air pressure, or data indicative of operational parameters of the hydrogen fuel assembly 104.

The computing device(s) 210 can also include a network interface 210E used to communicate, for example, with the other components of system 200 (e.g., via a network). The network interface 210E can include any suitable components for interfacing with one or more network(s), including for example, transmitters, receivers, ports, controllers, antennas, and/or other suitable components. One or more external display devices (not depicted) can be configured to receive one or more commands from the computing device(s) 210.

Referring now to FIG. 4, a flowchart outlining steps for a method for operation of an electronic combustion control system for a hydrogen fuel system, such as the electronic combustion control system 102 (hereinafter, "method 400") is provided. The steps of the method 400 may be stored as instructions in memory of a computing device or controller, such as one or more computing systems 200 of the engine 10 or a vehicle comprising engine 10. The computing system 200 may include one or more processors operably coupled to the memory to execute the instructions to perform operations at various embodiments of the electronic combustion control system 102 such as provided herein. Various embodiments of the methods provided herein may be computer-implemented methods executable by the computing system 200.

The operations include at 402 controlling the flow of hydrogen fuel from the hydrogen fuel source 106 via the hydrogen fuel delivery assembly 108 (e.g., via the metering valve 142). At 404, the method includes receiving inputs from one of more hydrogen detectors 130 and/or 160 indicating whether there is a presence of hydrogen fuel in the fuel line 152 and/or the combustor 116. At 406, the method includes, responsive to detecting the presence of hydrogen fuel on the combustor 116, controlling actuation of the igniter 118 within a predetermined time period from such detection (e.g., causing the igniter 118 to initiate a first spark within ten milliseconds from the issuance of a spark command to the exciter 120). At 408, the method includes controlling a spark rate of the igniter 118 (e.g., causing a spark rate of greater than twenty sparks per second). At 410, the method includes receiving input from lightoff detectors 132 and/or 162 indicating the presence of a flame in the combustor 116. At 412, the method includes, responsive to determining a lack of a flame in the combustor 116, ceasing the flow of hydrogen fuel to the combustor 116 and actuating the purge system 150.

Accordingly, embodiments of the present disclosure include one control system (e.g., a main or primary control system) for monitoring and managing certain engine operating parameters and a second control system operating at a faster response or update rate than the first control system for monitoring and managing the hydrogen-related operating parameters of the engine. The second, faster control system is used to monitor and control hydrogen fuel flow delivery, hydrogen fuel flow rates, the presence of hydrogen fuel in various locations of the engine, the combustion process associated with the hydrogen fuel, and a purge system for purging the hydrogen fuel from various parts of the engine. Instead of adding software and hardware complexity to the first or primary control system, sensor monitoring and operational control of the hydrogen-related aspects of the engine operation are performed by the second and faster dedicated control system. By having a dedicated control system controlling the hydrogen-related aspects of the engine and operating that control system at a faster feedback/response loop rate, unique aspects associated with the combustion of hydrogen are monitored and controlled in shorter time periods and without overburdening the primary control system. Further, embodiments of the present disclosure provide greater control of ignition processes associated with hydrogen fuel such as lightoff detection, spark rate, and exciter/igniter actuation.

Further aspects of the disclosure are provided by the subject matter of the following clauses:

A combustion control system for a vehicle having a turbine engine, the combustion control system comprising: a hydrogen fuel system comprising a fuel source providing a hydrogen fuel; a combustor operable to combust the hydrogen fuel to generate combustion gases; and a fuel delivery assembly operable to deliver the hydrogen fuel from the fuel source to the combustor; a first control system having a first update rate and operable to control one or more operational aspects of the turbine engine; and a second control system in communication with the first control system and the hydrogen fuel system, the second control system having a second update rate faster than the first update rate, the second control system operable to monitor at least one parameter associated with the hydrogen fuel system and output at least one control signal to the hydrogen fuel system to control the delivery or the combustion of the hydrogen fuel.

The combustion control system of any preceding clause, wherein the second control system controls a flow of the hydrogen fuel to the combustor.

The combustion control system of any preceding clause, wherein the combustor includes an igniter, and wherein the second control system controls operation of the igniter.

The combustion control system of any preceding clause, further comprising a purge system operable to purge the hydrogen fuel from the combustor, and wherein the second control system is operable to control actuation of the purge system.

The combustion control system of any preceding clause, wherein the combustor includes a lightoff detector, and wherein the second control system controls the combustor based on an input from the lightoff detector.

The combustion control system of any preceding clause, wherein the combustor includes a detector operable to detect a presence of the hydrogen fuel in the combustor, and wherein the second control system controls the combustor based on an input from the detector.

The combustion control system of any preceding clause, wherein the fuel delivery assembly includes a metering valve, and wherein the second control system controls actuation of the metering valve.

A combustion control system for a gas turbine engine, the combustion control system comprising: a fuel source providing a hydrogen fuel; a combustor having an igniter, the combustor operable to receive the hydrogen fuel and combust the hydrogen fuel via the igniter to generate combustion gases; a fuel delivery assembly extending from the fuel source to the combustor, the fuel delivery assembly providing the hydrogen fuel from the fuel source to the combustor;

and a control system in communication with the combustor and operable to control the igniter to provide a spark rate of at least twenty sparks per second.

The combustion control system of any preceding clause, wherein the igniter initiates a spark within ten milliseconds of receiving a spark command from the control system.

The combustion control system of any preceding clause, wherein the combustor includes a lightoff detector, and wherein the control system controls the combustor based on an input from the lightoff detector.

The combustion control system of any preceding clause, further comprising a purge system operable to purge the hydrogen fuel from the combustor.

The combustion control system of any preceding clause, wherein the combustor includes a detector operable to detect a presence of the hydrogen fuel in the combustor.

The combustion control system of any preceding clause, wherein the control system is in communication with the fuel delivery assembly and controls a flow of the hydrogen fuel to the combustor.

The combustion control system of any preceding clause, further comprising a sensor operable to detect a pressure of an airflow provided to the combustor, and wherein the control system controls a flow of the hydrogen fuel to the combustor based on the pressure.

A combustion control system for a gas turbine engine, the combustion control system comprising: a fuel source providing a hydrogen fuel; a combustor operable to receive the hydrogen fuel and combust the hydrogen fuel to generate combustion gases; a fuel delivery assembly extending from the fuel source to the combustor, the fuel delivery assembly providing the hydrogen fuel from the fuel source to the combustor; and a purge system operable to purge the hydrogen fuel from at least the combustor, the purge system having a purge fluid entry point into the fuel delivery assembly proximate a fuel entry point of the hydrogen fuel into the combustor.

The combustion control system of any preceding clause, further comprising a control system in communication with the purge system and operable to actuate the purge system.

The combustion control system of any preceding clause, further comprising a lightoff detector operable to detect a flame in the combustor, and wherein the control system is operable to actuate the purge system based on an input received from the lightoff detector.

The combustion control system of any preceding clause, wherein the fuel delivery assembly includes a check valve to limit a flow direction of the hydrogen fuel, and wherein the purge fluid entry point is downstream of the check valve and upstream of the combustor.

The combustion control system of any preceding clause, wherein the combustor includes a hydrogen detector operable to detect a presence of the hydrogen fuel in the combustor.

The combustion control system of any preceding clause, further comprising a control system operable to receive an input from the hydrogen detector and control actuation of the purge system based on the input from the hydrogen detector.

A non-transitory computer-readable medium having stored thereon executable instructions when executed by a processor unit cause the processor unit to perform a method of hydrogen fuel combustion control, the method comprising: collecting data from one or more sensors indicating a presence of a hydrogen fuel in a fuel line and/or a combustor; and responsive to detecting the presence of the hydrogen fuel in the fuel line and/or the combustor, actuating an igniter associated with the combustor within a predetermined time period of the detection.

The non-transitory computer-readable medium of any preceding claim, the executable instructions further configured to cause the processor unit to perform the method, including controlling a spark rate of the igniter.

The non-transitory computer-readable medium of any preceding claim, the executable instructions further configured to cause the processor unit to perform the method, including controlling the spark rate of the igniter at greater than twenty sparks per second.

The non-transitory computer-readable medium of any preceding claim, the executable instructions further configured to cause the processor unit to perform the method, including issuing a spark command to an exciter; and initiating a first spark by the igniter within ten milliseconds of issuing the spark command.

The non-transitory computer-readable medium of any preceding claim, the executable instructions further configured to cause the processor unit to perform the method, including receiving data indicating whether a flame is detected in the combustor; and, responsive to detecting a lack of the flame in the combustor, ceasing a flow of the hydrogen fuel to the combustor and actuating a purge system.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A combustion control system for a vehicle having a turbine engine, the combustion control system comprising:
   a hydrogen fuel system comprising:
      a fuel source providing a hydrogen fuel;
      a combustor operable to combust the hydrogen fuel to generate combustion gases; and
      a fuel delivery assembly operable to deliver the hydrogen fuel from the fuel source to the combustor;
   a first control system having a first update rate of between 12 milliseconds (ms) and 25 ms and operable to control one or more operating parameters of the turbine engine; and
   a second control system in communication with the first control system and the hydrogen fuel system, the second control system
      being dedicated to the hydrogen fuel system;
      having a second update rate of 10 ms or less; and
      being operable to monitor at least one parameter associated with the hydrogen fuel system and output at least one control signal to the hydrogen fuel system to control the delivery or the combustion of the hydrogen fuel.

2. The combustion control system of claim 1, wherein the second control system controls a flow of the hydrogen fuel to the combustor.

3. The combustion control system of claim 1, wherein the combustor includes an igniter, and wherein the second control system controls operation of the igniter.

4. The combustion control system of claim 1, further comprising a purge system operable to purge the hydrogen fuel from the combustor, and wherein the second control system is operable to control actuation of the purge system.

5. The combustion control system of claim 1, wherein the combustor includes a lightoff detector, and wherein the second control system controls the combustor based on an input from the lightoff detector.

6. The combustion control system of claim 1, wherein the combustor includes a detector operable to detect a presence of the hydrogen fuel in the combustor, and wherein the second control system controls the combustor based on an input from the detector.

7. The combustion control system of claim 1, wherein the fuel delivery assembly includes a metering valve, and wherein the second control system controls actuation of the metering valve.

8. The combustion control system of claim 1, wherein the first control system and the second control system are asynchronous to one another.

9. A combustion control system for a vehicle having a turbine engine, the combustion control system comprising:
    a fuel source providing a hydrogen fuel;
    a combustor having an igniter, the combustor operable to receive the hydrogen fuel and combust the hydrogen fuel via the igniter to generate combustion gases;
    a fuel delivery assembly extending from the fuel source to the combustor, the fuel delivery assembly providing the hydrogen fuel from the fuel source to the combustor;
    a first control system having a first update rate of between 12 milliseconds (ms) and 25 ms and operable to control one or more operating parameters of the turbine engine; and
    a second control system which is dedicated to and in communication with the combustor and operable to:
        receive an input from one or more hydrogen detectors;
        determine a presence of the hydrogen fuel in the combustor based on the input from the one or more hydrogen detectors; and
        control the igniter to provide a spark rate of at least twenty sparks per second in response to determining the presence of the hydrogen fuel.

10. The combustion control system of claim 9, wherein the igniter initiates a spark within ten milliseconds of receiving a spark command from the control system.

11. The combustion control system of claim 9, wherein the combustor includes a lightoff detector, and wherein the control system controls the combustor based on an input from the lightoff detector.

12. The combustion control system of claim 9, further comprising a purge system operable to purge the hydrogen fuel from the combustor.

13. The combustion control system of claim 9, wherein the control system is in communication with the fuel delivery assembly and controls a flow of the hydrogen fuel to the combustor.

14. The combustion control system of claim 9, further comprising a sensor operable to detect a pressure of an airflow provided to the combustor, and wherein the control system controls a flow of the hydrogen fuel to the combustor based on the pressure.

15. A combustion control system for a vehicle having a turbine engine, the combustion control system comprising:
    a fuel source providing a hydrogen fuel;
    a combustor operable to receive the hydrogen fuel and combust the hydrogen fuel to generate combustion gases;
    a fuel delivery assembly extending from the fuel source to the combustor, the fuel delivery assembly providing the hydrogen fuel from the fuel source to the combustor, wherein the fuel delivery assembly includes a check valve to limit a flow direction of the hydrogen fuel;
    a purge system operable to purge the hydrogen fuel from the combustor, the purge system having a purge fluid entry point into the fuel delivery assembly that is downstream of the check valve and upstream of the combustor;
    a first control system having a first update rate of between 12 milliseconds (ms) and 25 ms and operable to control one or more operating parameters of the turbine engine; and
    a second control system in communication with the purge system, wherein the second control system is dedicated to the purge system.

16. The combustion control system of claim 15, wherein the second control system is operable to actuate the purge system.

17. The combustion control system of claim 16, further comprising a lightoff detector operable to detect a flame in the combustor, and wherein the second control system is operable to actuate the purge system based on an input received from the lightoff detector.

18. The combustion control system of claim 15, wherein the combustor includes a hydrogen detector operable to detect a presence of the hydrogen fuel in the combustor.

19. The combustion control system of claim 18, wherein the second control system is operable to receive an input from the hydrogen detector and control actuation of the purge system based on the input from the hydrogen detector.

* * * * *